(12) United States Patent
McMullen (10) Patent No.: US 7,874,264 B2
(45) Date of Patent: Jan. 25, 2011

(54) DISPOSABLE WILD BIRD FEEDER

(76) Inventor: Joseph E. McMullen, 9 Fisher Rd., Greenville, SC (US) 29615

( * ) Notice: Subject to any disclaimer, the term of this patent is extended or adjusted under 35 U.S.C. 154(b) by 315 days.

(21) Appl. No.: 12/287,887

(22) Filed: Oct. 14, 2008

(65) Prior Publication Data

US 2010/0089330 A1    Apr. 15, 2010

(51) Int. Cl.
*A01K 61/02* (2006.01)
(52) U.S. Cl. ..................... 119/52.2; 119/57.8
(58) Field of Classification Search ............... 119/52.2, 119/53, 57.8, 52.1, 72, 77
See application file for complete search history.

(56) References Cited

U.S. PATENT DOCUMENTS

| | | | |
|---|---|---|---|
| 4,233,941 A | | 11/1980 | Webster |
| 4,606,298 A | | 8/1986 | Bridge |
| 4,732,112 A | * | 3/1988 | Fenner et al. ............. 119/52.2 |
| 4,840,143 A | * | 6/1989 | Simon ....................... 119/52.1 |
| 4,901,673 A | | 2/1990 | Overstreet |
| 4,947,797 A | | 8/1990 | Lawrence, Jr. |
| 5,062,388 A | * | 11/1991 | Kilham ..................... 119/52.2 |
| 5,269,242 A | * | 12/1993 | Toldi ........................ 119/52.2 |
| 5,397,033 A | * | 3/1995 | Blomquist ............... 222/185.1 |
| 5,507,249 A | | 4/1996 | Shaw |
| D454,669 S | | 3/2002 | Lieb |
| 6,834,616 B2 | | 12/2004 | Fort, II |
| 7,093,562 B2 | | 8/2006 | Smothers |
| D542,479 S | | 5/2007 | O'Dell |
| 7,234,418 B2 | | 6/2007 | Fort, II et al. |
| 2005/0000459 A1 | * | 1/2005 | Buhl et al. ................ 119/52.2 |
| 2006/0254527 A1 | * | 11/2006 | Nock ........................ 119/52.2 |
| 2009/0188432 A1 | * | 7/2009 | McMullen ................ 119/57.9 |

* cited by examiner

*Primary Examiner*—Timothy D Collins
*Assistant Examiner*—Monica Williams
(74) *Attorney, Agent, or Firm*—Robert R. Reed; Alan A. Csontos (57) ABSTRACT

The present invention is a disposable wild bird feeder with the features that make it safe and easy to use but protected from being reused. A transparent reservoir containing bird seed is connected with a feeding base. The feeding base is threaded to an adaptor portion of the reservoir. A locking means between the internal threads of the adaptor portion and the external threads of the feeding base discourages the assembled wild bird feeder from being taken apart and refilled. The wild bird feeder converts from a first storage and shipping configuration to a second feeding configuration by partially unthreading the feeding base from the adaptor so bird seed is supplied to the bottom portion of the feeding base. A plurality of perches are supported by the feeding base. The perches are moved from a stored position to approximately a horizontal deployed position when the second feeding configuration is realized. A removable label is placed on the reservoir to provide a logo, directions for safe use and bird seed data.

18 Claims, 9 Drawing Sheets

DISPOSABLE WILD BIRD FEEDER

BACKGROUND OF THE INVENTION

This invention is directed to wild bird feeder and more particularly to an economical design that allows the feeder to be discarded after use. In particular, the feeder has only biodegradable or recyclable parts that can be easily produced to provide the necessary components to be an effective and environmentally safe feeder for wild birds.

The most commonly used disposable wild bird feeders are configured to have a top reservoir portion containing bird seed in combination with a perch portion and feeding ports for the wild bird to access the feed. The term wild bird refers to any birds wild or domesticated. For most feeders a problem exists as a result of the feed becoming contaminated or unusable before it is totally consumed. For example, the feed may become moist resulting in an accumulation of germinated seeds and mold inside the reservoir. Cleaning of the reusable feeder must be frequent to maintain a desirable level of performance. Adequate cleaning is difficult for several reasons; requiring the use of a variety of tools to remove the contaminated feed. Proper cleaning is critical for maintaining the health of the birds. Classically this is not done very well. In addition, the supply of wild bird feed should be protected with utmost care so the feeder is filled with safe clean uncontaminated food for birds. These tasks are best done by those that manufacture the feeder, not the user. The terms seed, feed and food are used interchangeably herein to refer to the material placed in the feeder to be consumed by the birds. The preferred term is bird seed. The present invention includes the feeder filled with bird seed at the point of sale.

According to the present invention, the disposable wild bird feeder is intended for use only once. It is initially filled with wild bird seed in a storage and shipping configuration and is easily converted to a feeding configuration with only minor changes from the storage and shipping configuration. No cleaning is required as the feeder is discarded after use. In addition, the materials used to make the feeder are biodegradable or recyclable to eliminate any disposal problems or danger to the environment.

A further problem of many conventional wile bird feeders can results from ants and other crawling insects. The ants and insects travel down the hangar portion to reach the reservoir and feeding ports. A solution to this problem is disclosed in U.S. Pat. Nos.: 5,507,249; and 4,901,673. These patents disclose an upward opening receptacle at the top of the reservoir filled with an insect inhibiting fluid to provide an effective barrier for ants and insects. Unlike the present invention this art discloses a removable top portion and the feed material is a liquid for hummingbirds.

Disposable bird feeders are well known in the art. Disposable wild bird feeders typical of the industry are disclosed in U.S. Pat. Nos.: 4,947,797; 4,606,298; and 4,233,941. These patents show a seed container that can be converted to a bird feeder. However, these feeders have structures made of bendable sheet material of plastic or cardboard that are not durable and require extensive assembly or partial assembly of a plurality of parts where sidewalls are pushed inward and held by locking tabs or friction making them unreliable in use. Some feeders have only a single perch and access port making them less efficient for feeding a number of wild birds.

Bird feeders that disclose a reservoir threaded to a bottom base with perches are disclosed in U.S. Pat. Nos.: 7,234,418; 6,438,616; D542,479; and D454,669. These patents do not discourage the removal of the bottom base and refilling the reservoir. The U.S. Pat. No. 7,093,562 discloses various means for locking a wild bird feeder assembly to a reservoir to help make it a one time use only feeder. The present invention overcomes the above problems for wild bird feeders by providing a storage and shipping configuration which is inexpensive to manufacture but simple and positive in its operation to also provide a feeding configuration for wild birds.

Inasmuch as the art is relatively crowded with respect to wild bird feeders, it can be appreciated that there is a continuing need for and interest in improvements to such feeders. In this respect, the present invention addresses this need and interest.

Accordingly, it is the objective an object of the present invention is to provide a wild bird feeder with a simple and rugged design that is ready to put into service, safe to use and designed to discourage being refilled.

An essential object of the present invention is to provide a disposable wild bird feeder that is capable of being converted from a storage and shipping container into a feeder with a minimum of effort or skill at no additional expense.

Another object of the present invention is to provide a feeder construction that makes multiple perches and access ports available to the wild birds.

Yet another object of the present invention is to provide a feeder as in the foregoing objectives of simple and rugged design and low manufacturing cost which is biodegradable or recyclable so disposal is economically viable and protects the environment.

Yet a further object is to provide a means to protect the feed from contamination by ants and other insects.

Another additional object is to provide a label on the feeder that gives operational directions and warnings concerning possible contamination with reuse of the feeder.

SUMMARY OF THE INVENTION

The present invention is a wild bird feeder with the features that make it safe and easy to use but resistant to being reused. A transparent reservoir containing bird seed is connected to a feeding base using an cylindrical adaptor portion of the reservoir. The feeding base is threaded to the adaptor portion of the reservoir. A locking means keeps the assembled wild bird feeder from being easily taken apart and refilled. The wild bird feeder converts from a first storage and shipping configuration to a second feeding configuration by partially unthreading the feeding base from the adaptor portion so bird seed is supplied to the bottom portion of the feeding base. A plurality of perches are supported by perch supports made integral with the feeding base. The perches are moved from a vertical stored position to a horizontally deployed position when second feeding configuration is realized. A label is placed on the reservoir or packaging to provide a logo, directions for use, bird seed data and contamination warnings about reuse.

In a first embodiment of the invention a disposable wild bird feeder is provided comprising a transparent reservoir initially filled with wild bird seed having a closed and recessed top portion forming a mote and an open bottom forming a cylindrical adaptor portion with internal threads adjacent a bottom edge. A feeding base connected to the reservoir includes a flat bottom supporting a base collar, a center guide and a base ring. The base ring includes a center bore, a plurality of seed apertures and exterior ring threads that interface with the internal threads of the reservoir. A first storage and shipping configuration is realized by threading the feeding base onto the cylindrical adaptor until the bottom edge of the reservoir makes solid contact with the bottom portion of the feeding base to retain the wild bird seed within the reservoir. A second feeding configuration is realized when the bottom edge of the reservoir is spaced apart from the bottom portion of the feeding base allowing the bird seed to flow into the bottom portion of the feeding base. A plurality of perches, rotationally supported by perch supports, are built integrally with an outer edge of the bottom portion of the feeding base to be rotated from a vertical position into a horizontal position when the second feeding configuration is realized.

In one aspect of the invention the reservoir, the feeding base and the perches are made of a material which is biodegradable so that the wild bird feeder can be discarded without being a waste hazard. In addition, the exterior ring threads of the base ring interlocks with the interior threads of the adaptor portion of the reservoir when the feeding base is threaded to the reservoir so that refilling the reservoir is made more difficult. In a similar aspect of the invention, the feeding base and the perches are made of a material which is recyclable so that the wild bird feeder can be reused without being a waste hazard.

In another aspect of the invention, the base ring of the feeding base has a center bore and at least one seed aperture to allow the wild bird seed to reach the bottom portion of the feeding base when the feeding base is in the second feeding configuration. Also, the center guide has a conical shape to help discharge the wild bird seed from the base ring to the bottom portion of the feeding base.

In a further aspect of the invention said recessed top portion provides a moat to receive an insect inhibiting fluid to form a barrier against insects reaching said wild bird seed. In addition a label is placed on said reservoir to communicate at least operational instructions and information on the danger of contamination of the bird seed by refilling and reusing the feeder when empty.

A second embodiment of the invention comprises a method to provide a wild bird feeder that is disposed of after being used. The method comprises the first steps of providing a reservoir with an open bottom with a cylindrical adaptor portion having internal adaptor threads and a closed and recessed top having a hangar tab with a hangar. The second step includes providing a feeding base with a bottom portion, a base ring having external ring threads a base collar and a center guide. The third step includes placing the reservoir on a surface with the closed end downward and filling the reservoir through the open end with wild bird seed. In a fourth step the method includes threading the feeding base into the adaptor portion until a locking action is realized between the adaptor threads of the reservoir and the ring threads of the base ring of the feeding base. In a fifth step continue threading the feeding base into the adaptor portion until a bottom edge of the adaptor portion makes solid contact with the bottom portion of the feeding base to provide a storage and shipping configuration. A sixth step includes hanging the assembled feeder in an appropriate use location from the hangar in the top recess of the closed top of the reservoir. In a seventh step the method includes providing a plurality of perches rotationally supported by perch supports made integral with the outer edge of the bottom portion of the feeding base and properly rotating the perches to a horizontal position from the feeding base so that the wild birds can land and access the wild bird seed through the seed apertures consistent with the second feeding configuration. The eighth step includes placing the wild bird feeder into service by partially unthreading the feeding base from the adaptor portion for allowing the wild bird seed to flow into a bottom portion of the feeding base to be accessed through seed apertures in the base ring. In the ninth step the method includes discarding the wild bird feeder when the bird seed has been depleted.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
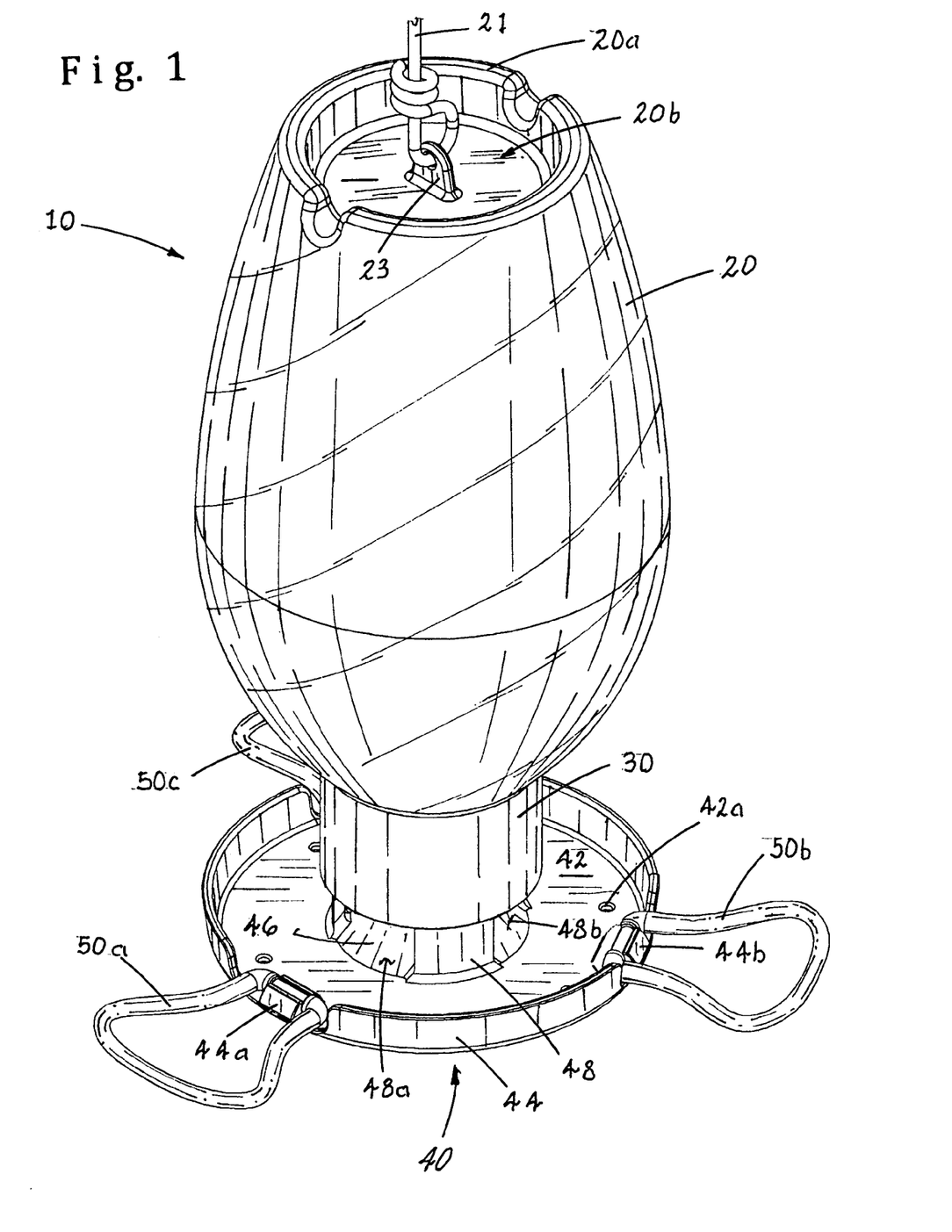
FIG. 1 is a perspective view of a DISPOSABLE WILD BIRD FEEDER showing my new design.
Figure 2:
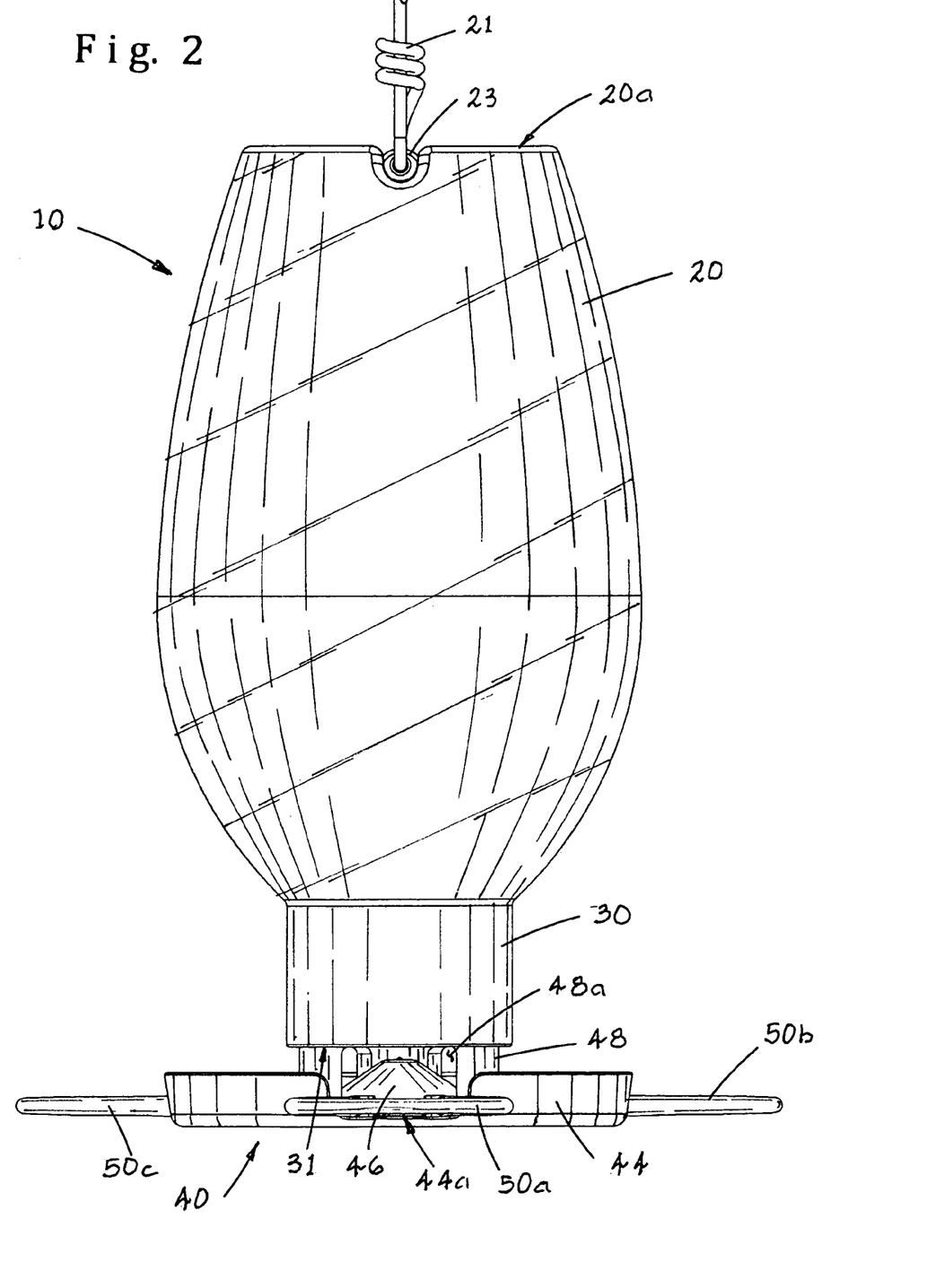
FIG. 2 is a front elevation view of the disposable wild bird feeder of FIG. 1, the opposite side being a mirror image.
Figure 3:
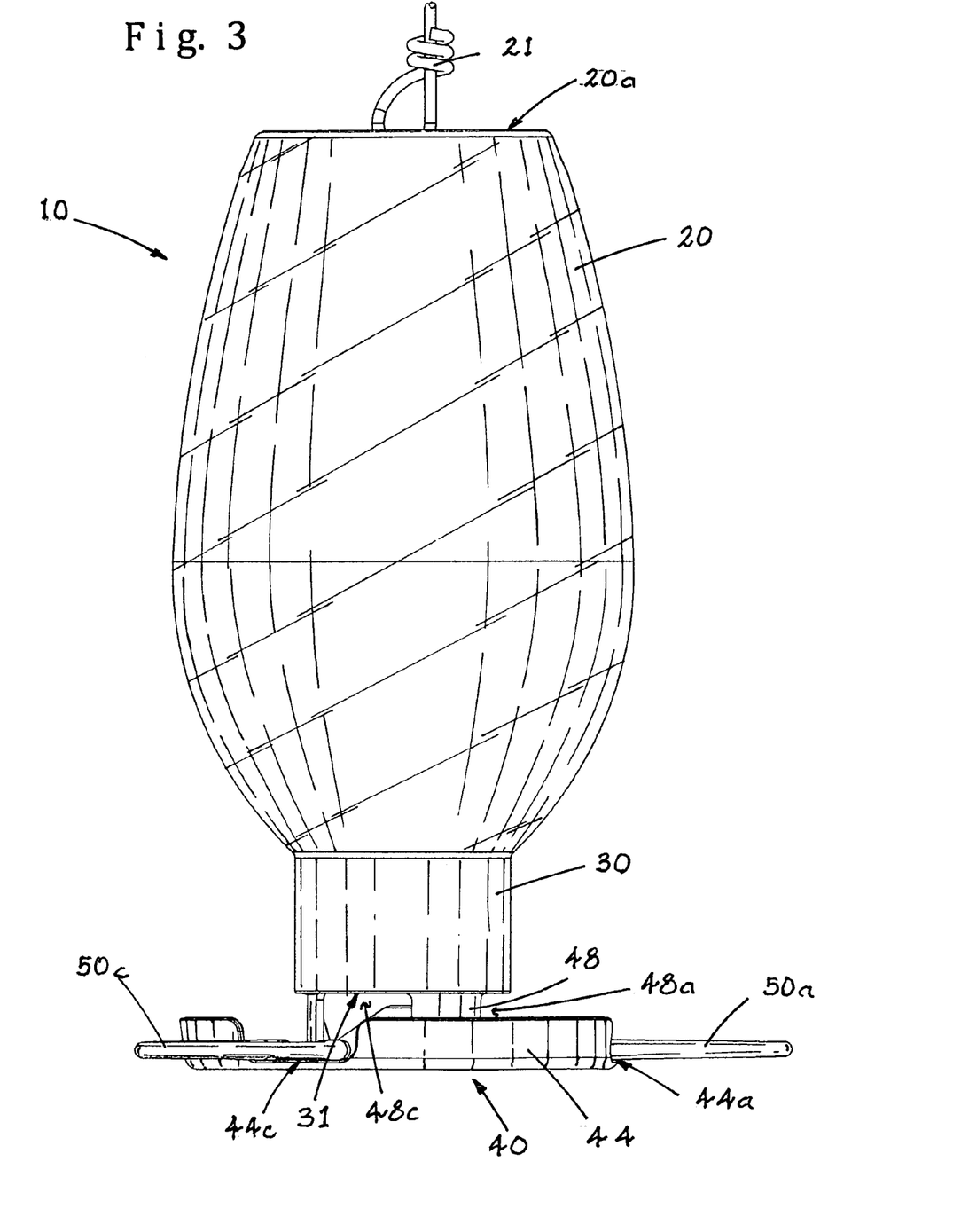
FIG. 3 is a left side elevation view of the disposable wild bird feeder of FIG. 1.

Referring now in more detail to the drawings, the invention will now be described in more detail. A perspective view of a wild bird feeder 10 in a feeding configuration according to this invention is illustrated in FIG. 1. A front elevation view of the wild bird feeder is shown in FIG. 2 and a left side elevation view is shown in FIG. 3. The following description describes in detain the invention by referring to these three figures. A reservoir 20 containing bird seed or food (herein called bird seed) has a cylindrical adaptor portion 30 which is connected to a feeding base 40. A base ring 48 of the feeding base is threaded to adaptor portion 30 to provide this connection. The base ring has a plurality of seed apertures 48a-48c through which the bird seed is discharged. A bottom portion 42 of the feeding base is displaced from a bottom edge 31 of adaptor portion 30 to receive the bird seed coming from the seed apertures. A cone shaped center guide 46 helps direct the bird seed to the bottom portion to be accessed by the birds. A base collar 44 helps retain the bird seed in the bottom portion. Perch supports 44a-44c are made integral with the bottom portion and support a plurality of perches 50a-50c in an approximately horizontal feeding position for the wild birds to land while they are feeding. The top of the reservoir has a top surface 20a with a top recess 20b that contains a hangar tab 23 for a hangar 21 to position the wild bird feeder in a location for optimum use. The top recess forms a moat with a mote bottom 22. The mote can be filled with a material around the hangar tab to inhibit ants and insects from crawling down the hangar to the reservoir and feeding base to contaminating the bird seed.

Figure 4:
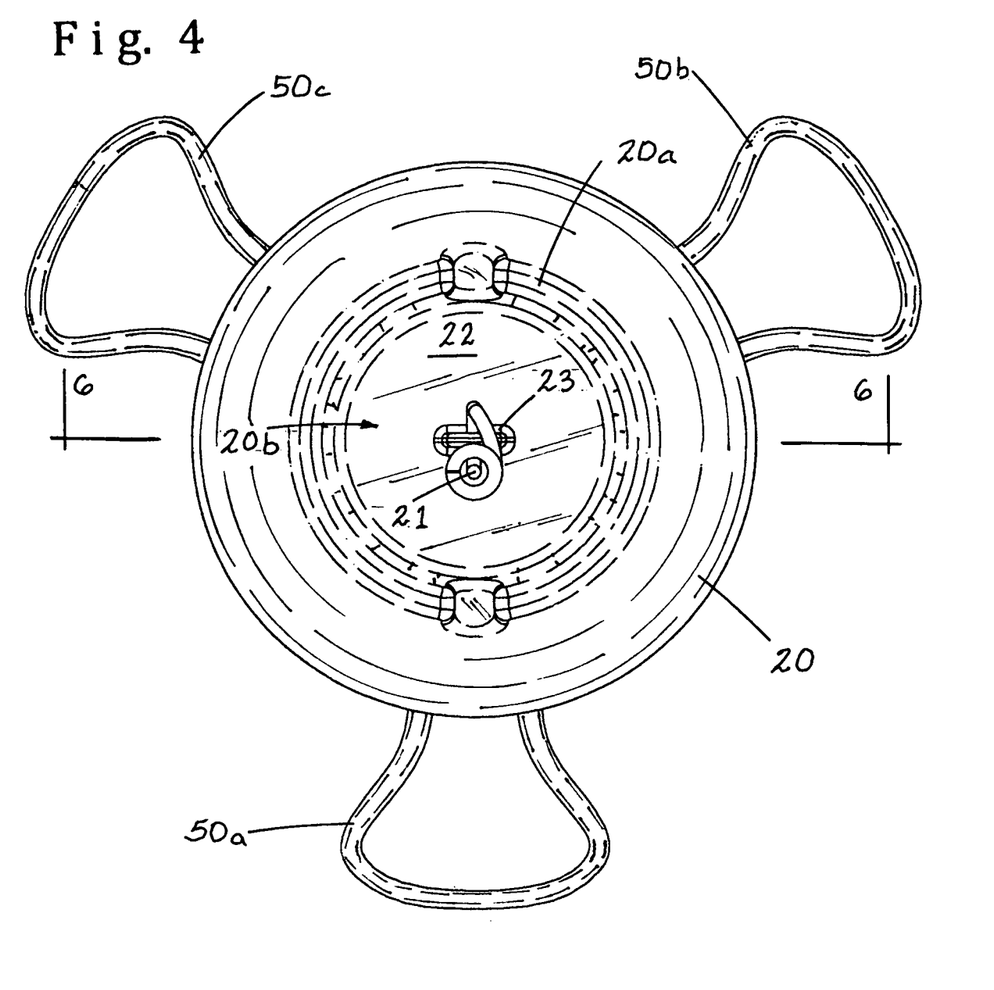
FIG. 4 is a top view of the disposable wild bird feeder of FIG. 1.
Figure 5:
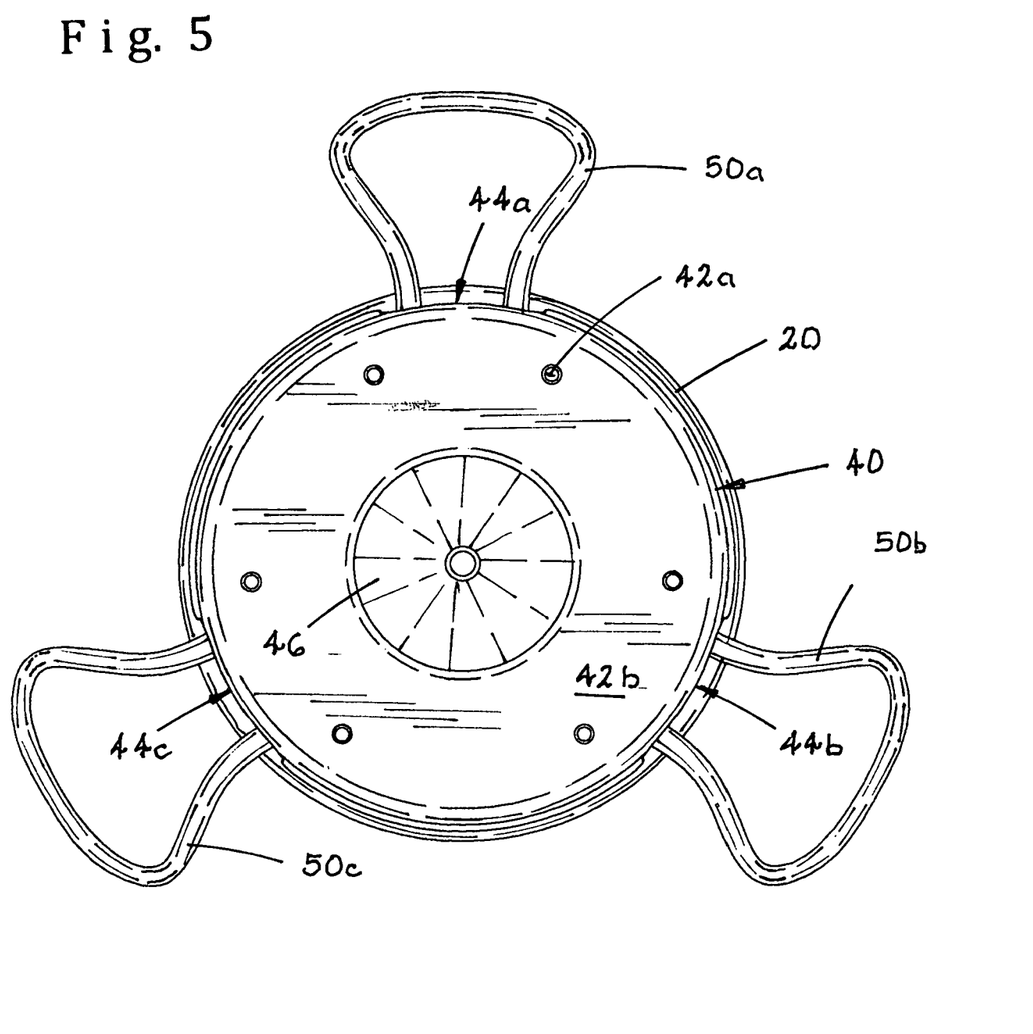
FIG. 5 is a bottom view of the disposable wild bird feeder of FIG. 1.

A top plan view of wild bird feeder 10 is shown in FIG. 4 and a bottom view is shown in FIG. 5. The preferred cross-sectional shape of the reservoir is circular. However, the reservoir must have cylindrical adaptor portion 30 with internal threads for connecting with external threads of feeding base 40. Additional details of feeding base 40 are discussed later and illustrated in FIG. 9. Perches 50a-50c of the wild bird feeder are in a feeding configuration in a plane approximately parallel to the plane of a lower surface 42b of the bottom portion 42. Top surface 20a is preferably a flat surface for better storage and shipping of the feeder prior to being used. Once again, recessed top 20b has hangar tab 23 centrally located so that the feeder can hang vertically. The bottom view of FIG. 5 illustrates center guide 46 projecting upward from a flat bottom surface 42b of the feeding base 40. A plurality of bottom apertures 42a are provided to allow the hanging wild bird feeder to drain during inclement weather. The number and size of the apertures can be increased to provide up to about 60 percent of the area of the bottom portion.

Figure 6:
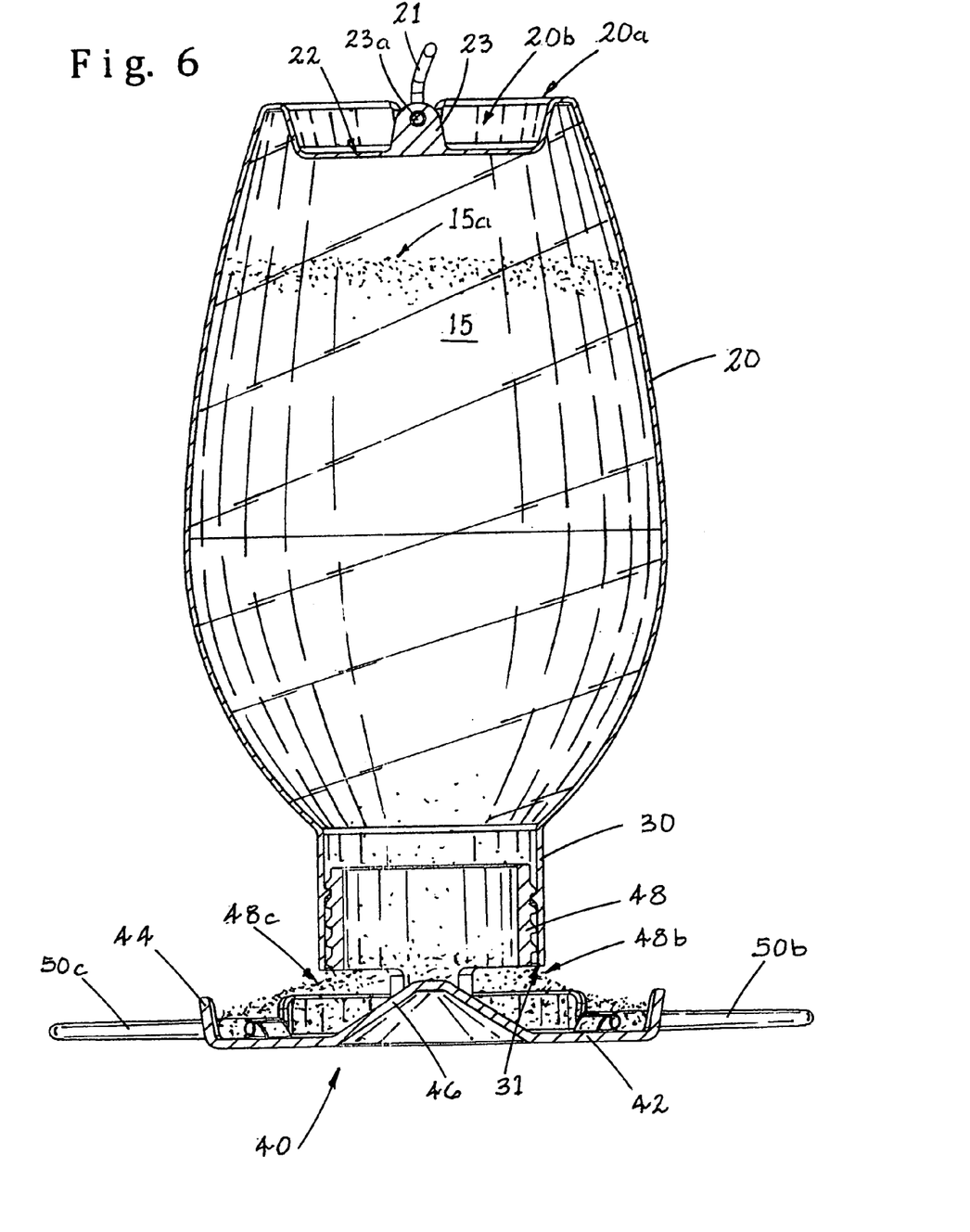
FIG. 6 is a sectional view of the disposable wild bird feeder of FIG. 1 taken along line 6-6 in FIG. 4.

Details of the wild bird feeder in the feeding configuration are further illustrated in the cross-sectional view of FIGS. 6. This view is taken along line 6-6 in FIG. 4 and shows bird seed 15 within reservoir 20. The wild bird feeder is in a second feeding configuration with bottom portion 42 of feeding base 40 displaced from bottom edge 31 of cylindrical adaptor portion 30. This displacement is made possible by the threaded interface between base ring 48 and adaptor portion 30. Rotating the feeding base relative to the reservoir produces this displacement and converts the wild bird feeder from the storage and shipping configuration (FIG. 7) to this feeding configuration. A typical locking feature of the threads limits the amount of displacement. This feeding configuration allows the wild bird seed to flow from seed apertures 48a and 48b of the base ring to be accessed by the birds using perches 50b and 50c positioned approximately horizontal. Base collar 44 helps retain the bird seed on bottom portion 42. Center guide 46 of the feeding base has a conical shape to direct the bird seed coming from reservoir 20 to the bottom portion.

Figure 7:
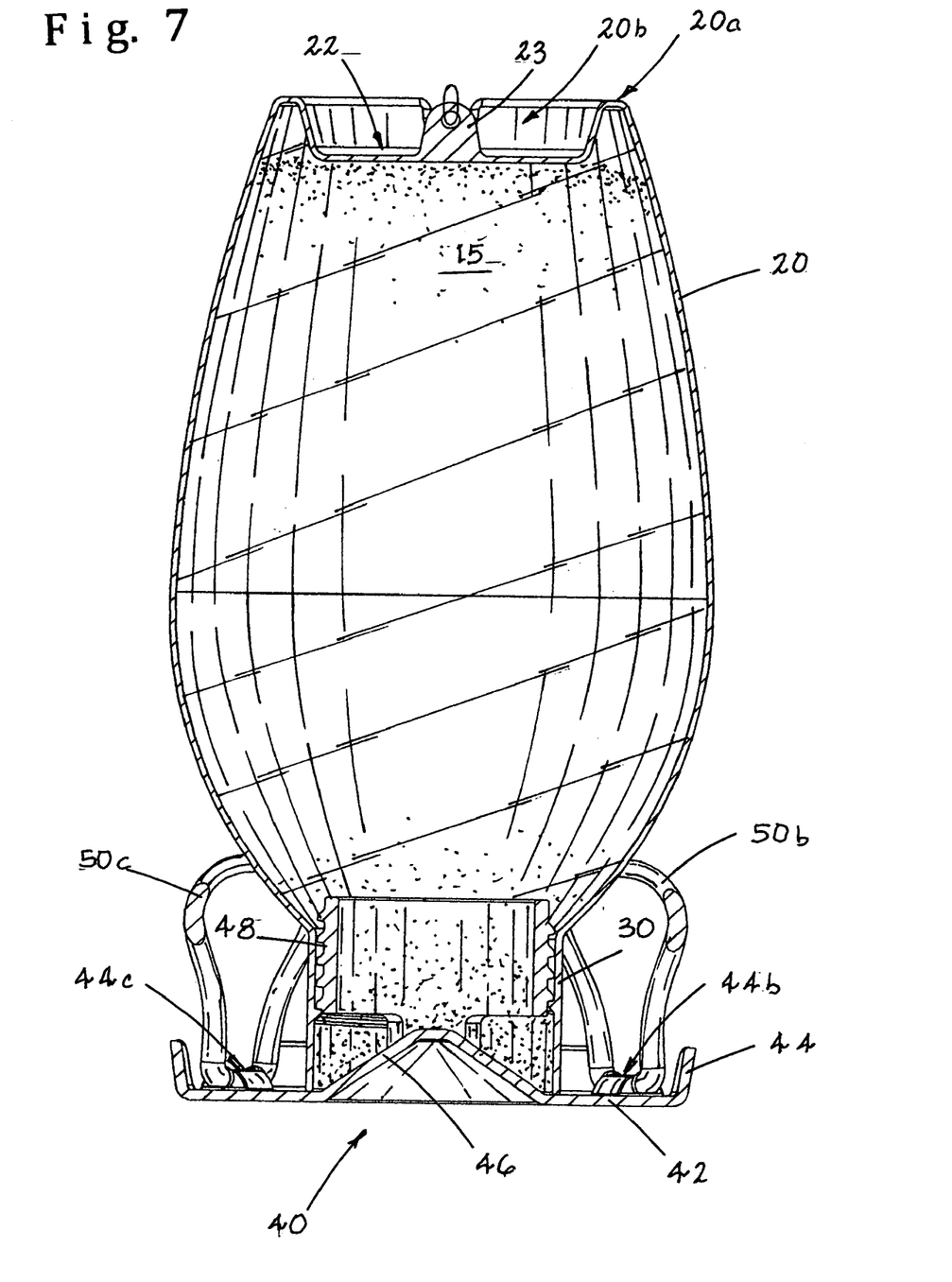
FIG. 7 is a sectional view of the disposable wild bird feeder of FIG. 1 in a shipping and storage configuration prior to use.

The top end of the reservoir is also shown in the cross-sectional view of FIGS. 6 and 7. Top surface 20a is flat to assist in the stacking of feeders when in storage, during shipping and on sale. Top recess 20b provides space for a moat above moat bottom 22. A hangar aperture 23a provides for using a hangar 21 to support the wild bird feeder. Hangar tab 23 is also recessed below the top surface so that it will not interfere with the stacked feeders. Material may be added in the mote to block the progress of ants and insects that contaminate the bird seed.

Details of the wild bird feeder in a first shipping and storage configuration are illustrated in the cross-sectional view of FIGS. 7. This view shows bird seed 15 filling the reservoir 20. The bird seed has been placed in the reservoir by the supplier to control and limit contamination of the seed prior to a purchase by the user and consumption by the birds. The wild bird feeder is in the first shipping and storage configuration with bottom portion 42 of feeding base 40 in contact with bottom edge 31 of cylindrical adaptor portion 30. A tight fit helps retain the bird seed within the reservoir. This first configuration is also made possible by the threaded interface between base ring 48 and adaptor portion 30. Rotating the feeding base relative to the reservoir produces this closed configuration for the storage and shipping of the wild bird feeder prior to the feeder being placed in service. Center guide 46 holds bird seed 15 within the reservoir. Perches 50b and 50c are rotated to approximately a vertical position to save space during shipping, while on display at the point of sale and during the initial hanging of the feeder using the hangar. Perch supports 44b and 44c provide the support and rotation functions necessary for the perches to be deployed.

Figure 8:
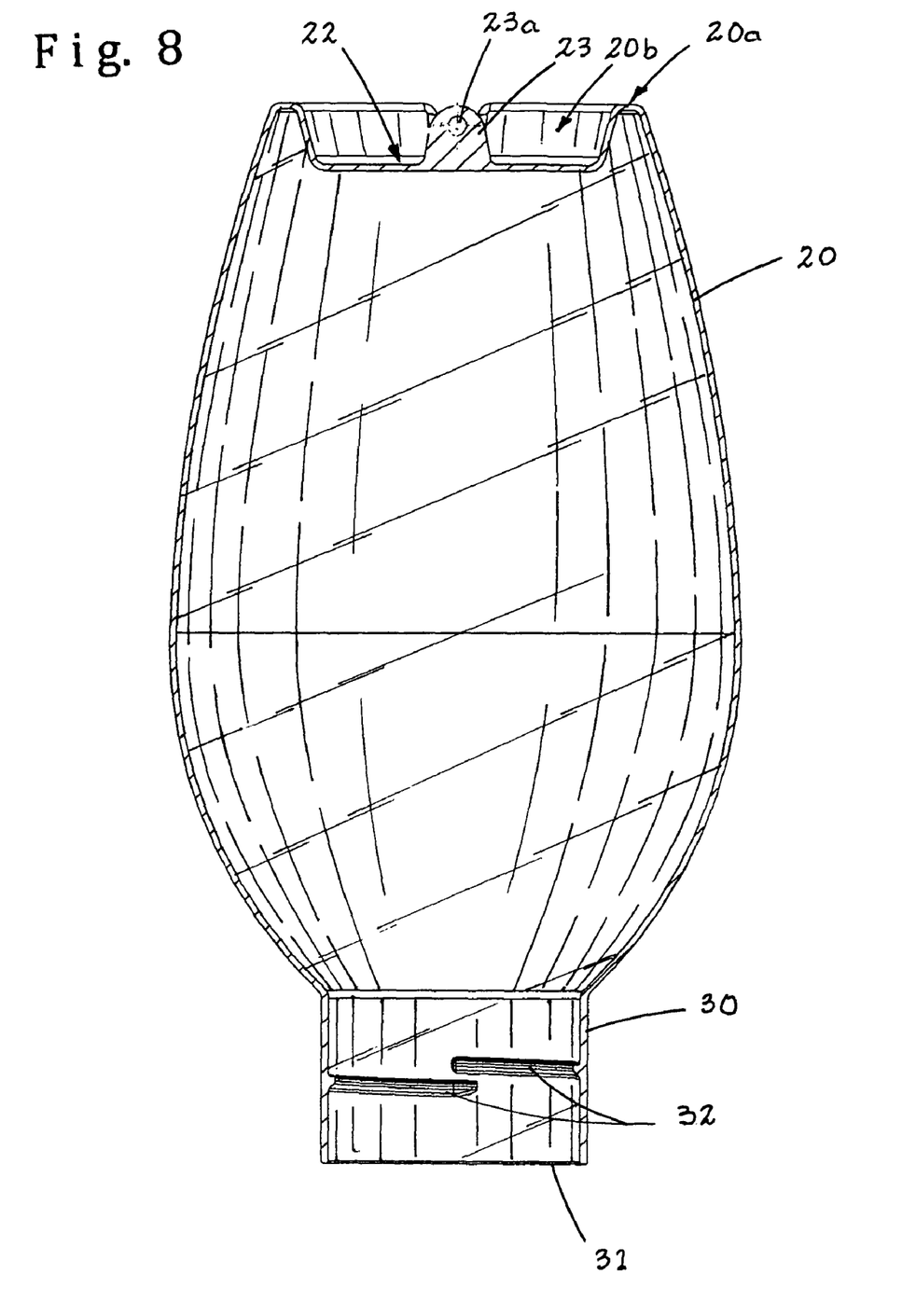
FIG. 8 is a sectional elevation view of a top portion of the disposable wild bird feeder of FIG. 1.

Reservoir 20 is made with adaptor 30 as a single unit as illustrated in the cross-sectional view of FIG. 8. The reservoir and adaptor are made of a transparent material so that the user can see when the wild birds have consumed the bird seed and the feeder needs to be replaced. Once again, top recess 20b has a bottom 22 to provide for a mote with hangar tab 23 having tab aperture 23a to receive a hangar (not shown). The preferred cross-sectional shape of the main reservoir portion is circular. Other shapes of the top portion of the reservoir are within the scope of the invention; including any polygonal, rectangular, square and the like shapes. These shapes can also include rounded corners. Once again, cylindrical adaptor portion 30 above bottom edge 31 has internal adaptor threads 32 that interface with threads of the feeding base.

The materials used for transparent reservoir 20 are preferably clear plastic which is biodegradable or recyclable. The transparent feature of these materials allows the user to gage the amount of bird seed remaining in the reservoir before the wild bird feeder is replaced. The transparent reservoir is also important for attracting birds to the feeder. The reservoir is specifically designed to prevent spoilage by making the reservoir small to provide only a few days supply of the bird seed. The preferred capacity is about one quart or a liter. A larger size will be provided for heavy use areas. The use of biodegradable or recyclable materials has become increasingly popular and great improvements are being made to change the composition of the material for safe disposal or reuse.

Figure 9:
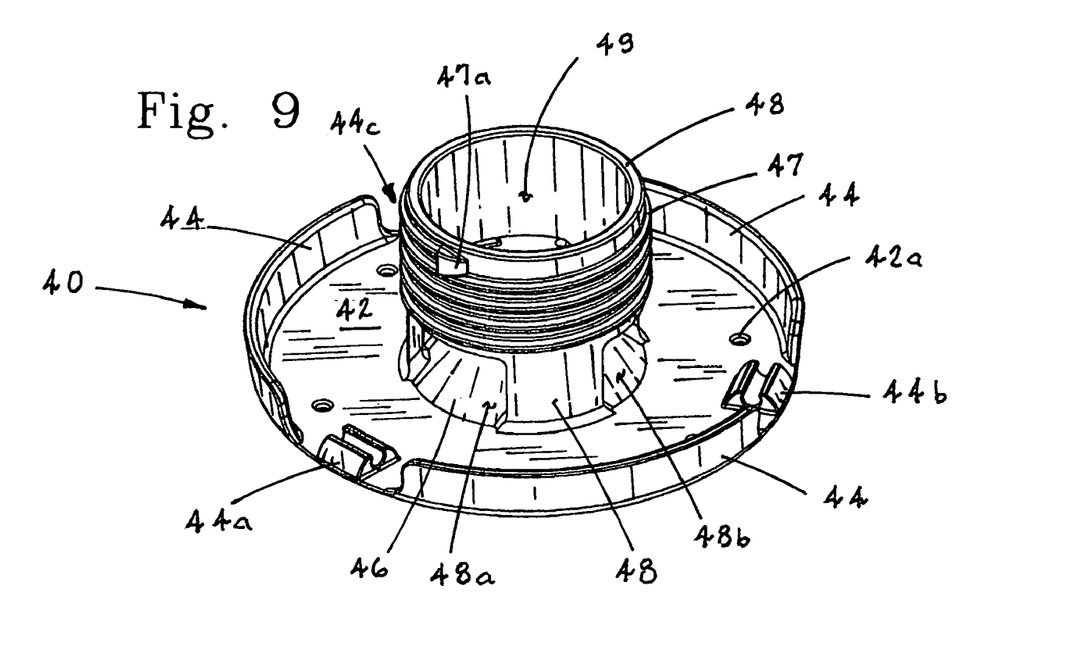
FIG. 9 is a perspective view of a bottom portion of the disposable wild bird feeder of FIG. 1 that is threaded and locked to the top portion of FIG. 8.

Additional details of feeding base 40 are provided by illustrating the feeding base alone. A perspective view of the feeding base is illustrated in FIG. 9. This perspective view shows the feeding base with perches 50a-50f removed from perch supports 44a-44c. Base ring 48 is supported by bottom portion 42 and includes a plurality of seed apertures 48a-48c to provide a good distribution of bird seed in the bottom portion. Center guide 46 is sloped on the top to assist the bird seed in reaching a respective seed aperture in the base ring. Base collar 44 helps retain the bird seed on bottom portion 42. Ring threads 47 interface with adaptor threads 37 (see FIG. 8). Stop 47a is a part of the ring threads to control the removal of the feeding base from the adaptor portion of reservoir after the feeding base is initially threaded on the adaptor. The stop contacts the adaptor threads and prevents removal of the feeding base from the assembled ready-to-use wild bird feeder to help prevent reuse of the feeder. That is, once the wild bird feeder is assembled with the bird seed added the feeding base is threaded on the adaptor until bottom edge 31 contacts bottom portion 42. It can not be taken apart to add more bird seed and used again without considerable effort. A label can also be added to the outer surface of each feeder or the packaging to clearly warn the user against reusing the wild bird feeder. The critical factor is to make the feeder a low cost feeder that can be disposed of after use. The stop also controls the displacement of bottom portion 42 from adaptor portion 30 to limit the amount of bird seed coming from a center bore 49 of the base ring through seed apertures 48a-48c.

Figure 10:
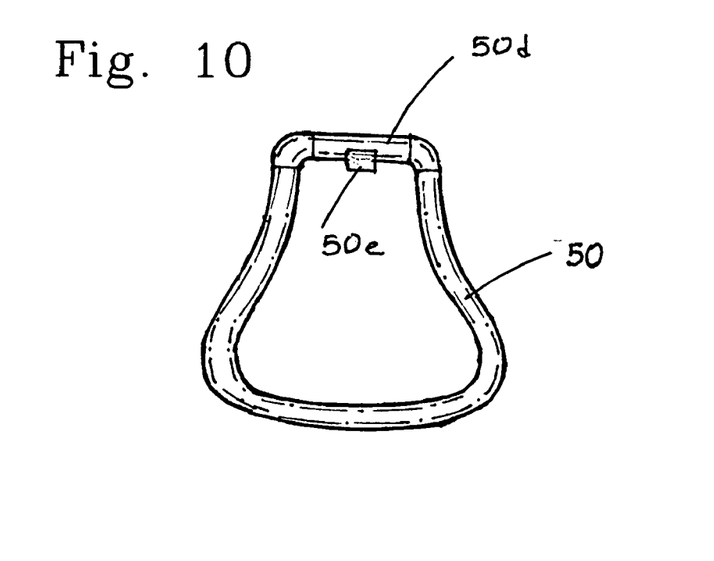
FIG. 10 is a plan view of one perch of a plurality of perches rotationally attached to perch supports of the bottom portion of FIG. 9 to support feeding birds of the disposable wild bird feeder of FIG. 1.

A single perch 50 of the plurality of perches 50a-50c is illustrated in FIG. 10. A perch connector portion 50d interfaces with a perch support 44 of the feeding base so that the perch can rotate in the perch support. A stop 50e retains the perch in approximately a horizontal position when the feeding configuration is realized.

The material used for feeding base 40, as well as the perches, is preferably a plastic material which is biodegradable or recyclable. Once again, the use of biodegradable or recyclable materials has become increasingly popular and great improvements are being made to change the composition of the material for safe disposal and reduced material costs.

The preferred bird seed 15 is a mixture of seeds including but not limited to sunflower, millet, thistle, milo, oat, barley and/or corn seeds. These seeds are commonly found as "wild bird seed" in the feed and seed stores or supermarkets. The seed is added by the manufacturer prior to the sale of the wild bird feeder to control the type and quality of bird seed. A label is added to each bird feeder or the packaging to describing the bird seed contained therein. The wild bird feeder of this invention can not be refilled with seed when the bird seed is consumed without damaging the feeder. This helps protect the wild birds from contaminated feed as a result of refilling the feeder.

An ant and insect inhibiting material added in the recessed top 20*b* (see FIG. 4) is preferably a non-toxic mineral material 25. The material provides an effective barrier which prevents insects, and especially ants, from traveling down the hangar to the feeding base and into the bird seed.

The insect inhibiting material may also comprise some form of insecticide or agent or water treated with a wetting agent such as soap.

While a preferred embodiment of the invention has been described using specific terms an a particular prior art reference, such description is for illustrative purposes only, and it is to be understood that changes and variations may be made without departing from the spirit or scope of the following claims. The foregoing is considered to be illustrative only of the principles of the invention. Since numerous modifications and changes will readily occur to those skilled in the art, it is not desirable to limit the invention to the exact construction and operation shown and described. The general size and shape of the feeder can vary to accommodate birds of different size and capacity to consume the feed. Accordingly, all suitable modifications and equivalents may be resorted to, falling within the scope of this invention. All equivalent relationships to those illustrated in the drawings and described in the specifications are intended to be encompassed by the present invention.

What is claimed is:

1. A disposable wild bird feeder comprising:
    a transparent reservoir initially filled with wild bird seed having a closed and recessed top portion forming a mote and an open bottom forming a cylindrical adaptor portion with internal threads adjacent a bottom edge;
    a feeding base connected to the reservoir including a flat bottom portion supporting a base collar, a center guide and a base ring;
    said base ring including a center bore, a plurality of seed apertures and exterior ring threads that interface with said internal threads of said reservoir, wherein a first storage and shipping configuration is realized by threading said feeding base onto said cylindrical adaptor until said bottom edge of said reservoir makes solid contact with said bottom portion of said feeding base, to retain said wild bird seed within said reservoir, and a second feeding configuration is realized when said bottom edge of said reservoir is spaced apart from said bottom portion of said feeding base allowing said bird seed to flow into said bottom portion of said feeding base; and
    a plurality of perches rotationally supported by perch supports built integrally with an outer edge of said bottom portion of said feeding base to be rotated from a vertical position into approximately a horizontal position when said second feeding configuration is realized.

2. The wild bird feeder of claim 1, wherein said reservoir, said feeding base and said perches are made of a material which is biodegradable so that the wild bird feeder can be discarded without being a waste hazard.

3. The wild bird feeder of claim 1, wherein said reservoir, said feeding base and said perches are made of a material which is recyclable so that the wild bird feeder material can be reused without being a waste hazard.

4. The wild bird feeder of claim 1, wherein said exterior ring threads of said base ring interlocks with said interior adaptor threads of said adaptor portion of said reservoir when said feeding base is threaded to said reservoir so that refilling said reservoir is made more difficult.

5. The wild bird feeder of claim 1 wherein said base ring of said feeding base has a center bore and at least one seed aperture to allow said wild bird seed to reach said bottom portion of said feeding base when said feeding base is in said second feeding configuration.

6. The wild bird feeder of claim 5 wherein said center guide has a conical shape to help discharge said wild bird seed from said base ring to said bottom portion of said feeding base.

7. The wild bird feeder of claim 6 wherein there are three seed apertures equally spaced around said base ring of said feeding base and three corresponding perch supports with perches at said outer edge of said bottom portion, wherein said base collar has cutouts to provide for said perch supports.

8. The wild bird feeder of claim 6 wherein said seed apertures are blocked from discharging said bird seed into said bottom portion of said feeding base by said adaptor portion of said reservoir when said first storage and shipping configuration is realized.

9. The wild bird feeder of claim 1 wherein said recessed top portion of said reservoir includes a hangar tab with an aperture to receive a hangar to hang the wild bird feeder in an optimum location.

10. The wild bird feeder of claim 9 wherein said recessed top portion provides a moat to receive an insect inhibiting material to form a barrier against insects reaching said wild bird seed.

11. The wild bird feeder of claim 1 including a label placed on said reservoir to communicate at least operational instructions and information on the danger of contamination of said bird seed by refilling and reusing said feeder when empty.

12. The wild bird feeder of claim 1 wherein said reservoir has an upper portion with a polygonal shape and round corners and a cylindrical lower portion to interface with said adaptor portion.

13. The wild bird feeder of claim 1 including a plurality of bottom apertures in said bottom portion to allow the hanging wild bird feeder to drain during inclement weather.

14. A method to provide a wild bird feeder that is disposed of after being used comprising the steps of:
    a) providing a reservoir with an open bottom with a cylindrical adaptor portion having internal adaptor threads and a closed top end with a top recess having a hangar tab with a hangar;
    b) providing a feeding base with a bottom portion, a base ring having external ring threads a base collar and a center guide;
    c) placing said reservoir on a surface with said closed top end downward and filling said reservoir through said open bottom with wild bird seed;
    d) threading said feeding base into said adaptor portion until a locking action is realized between said adaptor threads of said adaptor portion and said ring threads of said base ring of said feeding base;

e) continue threading said feeding base into said adaptor portion until a bottom edge of said adaptor portion makes solid contact with said bottom portion of said feeding base to provide a storage and shipping configuration;

f) turning the feeder over and hanging said assembled feeder in an appropriate use location from said hangar in said top recess of said closed top of said reservoir;

g) providing a plurality of perches rotationally supported by perch supports made integral with the outer edge of said bottom portion of said feeding base and properly rotating said perches to a horizontal position from said feeding base so that the wild birds can land and access said wild-bird seed through said seed apertures consistent with the second feeding configuration;

h) placing the wild bird feeder into service by partially unthreading said feeding base from said adaptor portion for allowing said wild bird seed to flow through seed apertures in said base ring into a bottom portion of said feeding base to be accessed by the wild birds; and i) replacing the wild bird feeder when said bird seed has been depleted.

15. The method of claim 14 wherein the steps of providing said reservoir, said feeding base and said perches includes using materials which are biodegradable, so that the wild bird feeder can be discarded without being a waste hazard.

16. The method of claim 14 wherein the steps of providing said reservoir, said feeding base and said perches includes using materials which are recyclable, so that the wild bird feeder material can be reused without being a waste hazard.

17. The method of claim 14 wherein the method of allowing said bird seed to flow into said bottom portion of said feeding base includes providing a center bore of said base ring and said center guide to help direct said wild bird seed to said bottom portion of said feeding base through said seed apertures.

18. The method of claim 14 further including the step of placing a removable label on the bird feeder at the point-of-sale to include information on the use of the feeder and a warning concerning the danger to the wild birds resulting from refilling and reusing the wild bird feeder.

* * * * *